(12) United States Patent
Carney

(10) Patent No.: US 8,139,246 B2
(45) Date of Patent: Mar. 20, 2012

(54) PRINTER DYNAMICALLY TRACKING PRINT JOBS AND METHOD OF TRACKING PRINT JOBS

(75) Inventor: Dennis Michael Carney, Louisville, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1270 days.

(21) Appl. No.: 11/462,822

(22) Filed: Aug. 7, 2006

(65) Prior Publication Data

US 2008/0030765 A1    Feb. 7, 2008

(51) Int. Cl.
*G06F 3/12* (2006.01)
*G06F 3/00* (2006.01)
*G06K 15/00* (2006.01)

(52) U.S. Cl. ............... 358/1.15; 358/1.13; 358/1.16; 710/19

(58) Field of Classification Search ............... None
See application file for complete search history.

(56) References Cited

U.S. PATENT DOCUMENTS

| | | | |
|---|---|---|---|
| 6,272,518 B1 | 8/2001 | Blazo et al. | |
| 6,363,255 B1 | 3/2002 | Kuwahara | |
| 6,833,221 B2 | 12/2004 | McArthur et al. | |
| 2002/0080389 A1* | 6/2002 | Carney et al. | 358/1.15 |
| 2003/0133145 A1* | 7/2003 | Koppich et al. | 358/1.15 |
| 2004/0008711 A1* | 1/2004 | Lahti et al. | 370/428 |
| 2005/0068547 A1* | 3/2005 | Negishi et al. | 358/1.1 |
| 2005/0141006 A1* | 6/2005 | Aiyama | 358/1.13 |
| 2005/0257101 A1* | 11/2005 | Adams | 714/48 |
| 2007/0070392 A1* | 3/2007 | Harrison et al. | 358/1.15 |
| 2007/0182988 A1* | 8/2007 | Maeda | 358/1.15 |

OTHER PUBLICATIONS

Marei S. Al-Amri et al., "New job selection and location policies for load-distributing algorithms," International Journal of Network Management, pp. 165-178, Jan. 28, 2002.
Christian S. Jensen et al., "Multidimensional Data Modeling for Location-Based Services," GIS'02, Nov. 8-9, 2002, McLean, Virginia.

* cited by examiner

*Primary Examiner* — Benny Tieu
*Assistant Examiner* — Fan Zhang
(74) *Attorney, Agent, or Firm* — Law Office of Charles W. Peterson, Jr.; Dale M. Crockatt; Ronald R. McCurdy, Esq.

(57) ABSTRACT

A printer and method of managing print jobs in the printer. Print job locations are identified in the printer. Each print job being printed is always in at least one of the print job locations and the locations are monitored for entering and exiting jobs. The printer includes a job location mask for each print job. Each bit location in the job location mask corresponds to one of the print job locations and a set bit indicates the presence of a print job in a corresponding print job location. As a print job enters a location, the location issues a call and the job location mask is updated to reflect the presence of the print job in that location.

18 Claims, 3 Drawing Sheets

PRINTER DYNAMICALLY TRACKING PRINT JOBS AND METHOD OF TRACKING PRINT JOBS

BACKGROUND OF THE INVENTION

1. Field of the Invention

The present invention generally relates to high performance printers and more particularly to monitoring print jobs being printed in such a printer.

2. Background Description

State of the art printers, such as laser printers, are complex multi-featured units that typically provide users with robust printing for professional results. Typically, these state of the art printers include an embedded control system for monitoring and controlling numerous print jobs at various stages of being printed by the printer. Frequently, a user or operator may wish to know where a particular previously submitted print job is in the printer, e.g., spooled, partially processed for duplex printing, printing or printed. Similarly, one may wish to determine which and how many jobs are ahead of a particular job, e.g., a job that currently is being converted to a raster pattern. However, the complexity of these state of the art printers makes it difficult to track the progress of a single job or, even to identify what jobs are currently being subjected to a particular operation or, at a specific stage within the printer.

However, often it is desirable to retrieve general status information for any print job or for any printer component. This information can be useful in debugging, e.g., for determining why a particular job has failed to print and where the failed job has stalled or hung. Unfortunately, since many printer components operate somewhat independently, identifying where and how a particular job or jobs have failed is not a straightforward task, but may be very difficult and complicated. Current technology and state of the art printers do not provide for determining exactly which job is currently in which job location at any given time.

Thus there is a need for a way to dynamically locate and track print jobs being processed in a printer.

SUMMARY OF THE INVENTION

It is therefore a purpose of the invention to dynamically locate print jobs traversing a printer;

It is another purpose of this invention to dynamically track print jobs traversing a printer;

It is yet another purpose of the invention to dynamically identify which printer components are operating on which ones of several print jobs that are traversing a printer;

It is yet another purpose of the invention to dynamically locate and track each of several print jobs that may be traversing a printer and further, to identify which printer components are operating on which ones of the print jobs.

The present invention is related to high performance printers and method of managing print jobs in such printers. Print job locations are identified in the printer. Each print job being printed is always in at least one of the print job locations and the locations are monitored for entering and exiting jobs. The printer includes a job location mask for each print job. Each bit location in the job location mask corresponds to one of the print job locations and a set bit indicates the presence of a print job in a corresponding print job location. As a print job enters a location, the location issues a call and the job location mask is updated to reflect the presence of the print job in that location.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
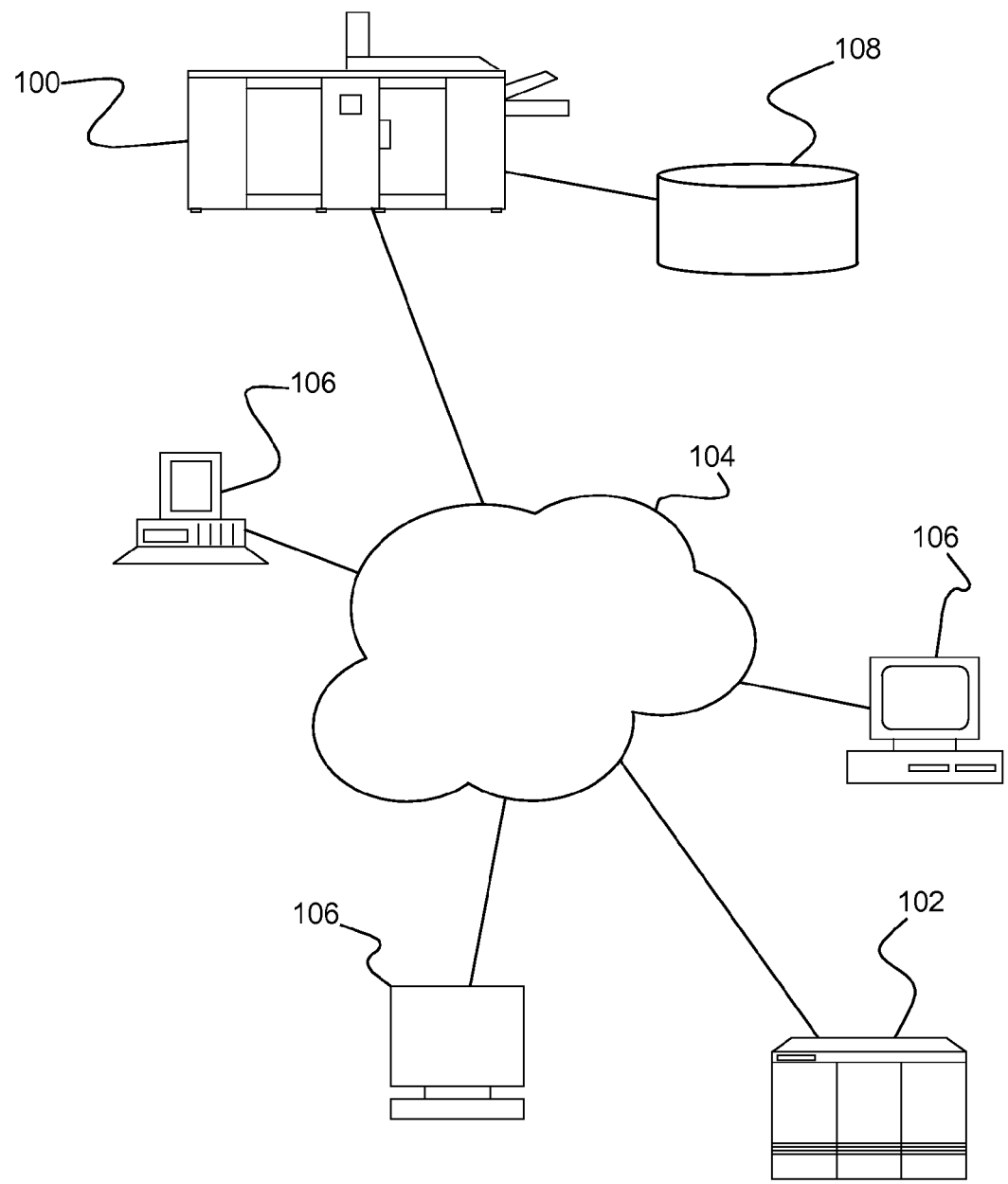
FIG. 1A shows an application example of a preferred embodiment printer with a print job location identifier dynamically tracking print jobs being processed by the printer according to a preferred embodiment of the present invention.

Turning now to the drawings, and more particularly, FIG. 1A shows an application example of a preferred embodiment printer 100 that dynamically monitors and tracks print jobs being processed by the printer 100. The printer 100 may be connected to one or more host systems 102, directly or, over a network 104. Also, remote terminals 106 may be connected and pass print jobs to the printer 100, e.g., over the network 104. According to a preferred embodiment of the present invention, the printer 100 maintains a job location mask, e.g., in local storage 108, for each print job with which the printer 100 dynamically tracks each print job as it passes through printer units or locations and, eventually, is printed.

Figure 1B:
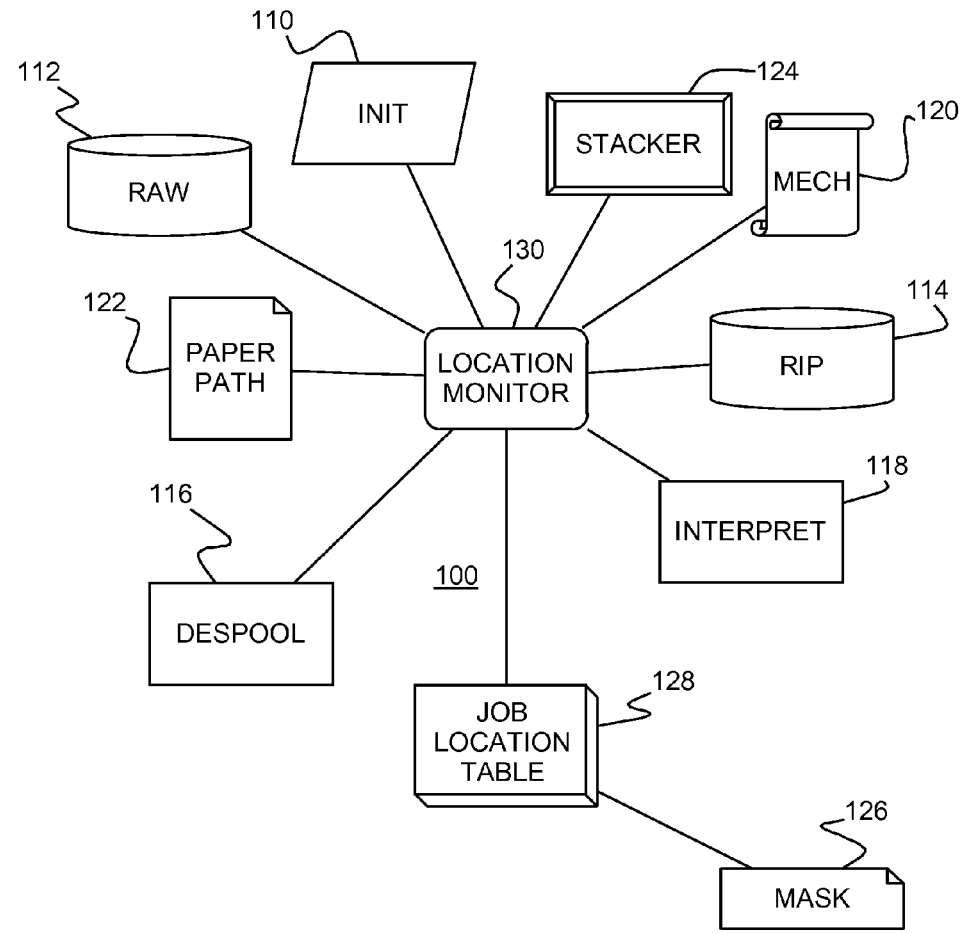
FIG. 1B shows a simple example in more detail of a preferred printer with representative job locations that a print job may traverse from job entry until the print job is finally printed.

FIG. 1B shows a simple example in more detail of a preferred printer 100 with representative job locations that a print job may traverse from job entry until the print job is finally printed. Typically, a number of locations are defined in a preferred printer 100, such that each job is always in one or more, but at least one location. Thus, progress for any job in the preferred printer 100 may be described by its location. Further, the locations may be one of several different types of job locations, including for example, an initial location 110, a number of storage locations (a raw spool 112 and a RIP spool 114 in this example), printer components (e.g., despooling/despooler 116, interpreting/interpreter 118 and Mech 120) and physical locations (e.g., the paper path 122 and the stacker 124). The printer 100 maintains a job location mask 126 for each current print job being printed by the printer 100, e.g., in a job location table 128 in local store 108 of FIG. 1A. Also in this example, the printer 100 includes a job location monitor 130 that monitors active print jobs and may maintain the corresponding job location masks 126 for each.

Although shown in this example as having an initial location 110, storage locations 112, 114, printer components 116, 118, 120 and physical locations 122, 124, this is for example only and not intended as a limitation. Any number of other suitable locations may be identified within a preferred printer 100. For example, a number of job queues may be defined that are typically, queues between components, e.g., between the despooler 116 and the interpreter 118. Whenever one component, e.g., despooler 116, has completed processing all or part of a job, and is prepared to hand off to the next component in the flow, e.g., interpreter 118, the first component often accomplishes this hand-off by queuing the work into a queue (not shown) identified with the next component. So, for this example, as the despooler 116 pulls a job from the raw spool 112, the despooler 116 queues each piece of the job into the interpreter 118 queue. So, preferably, a queue is a job location with queued jobs in a queue and in no other location or not yet in another location. For example, a print job is queued when the despooler 116 is done with the print job, but the interpreter 118 has not yet started on it. Print jobs in the raw spool 112 and rip spool 114 are fully stored on the spool 112, 114 and remain there until the job is ready to be deleted. Mech 120 is the printing mechanism. Physical job locations 122, 124 are hardware locations within the printer 100. So, for example, with sheets being printed in Mech 120, passing through the paper path 122 and being stacked in the stacker 124.

Figure 2:
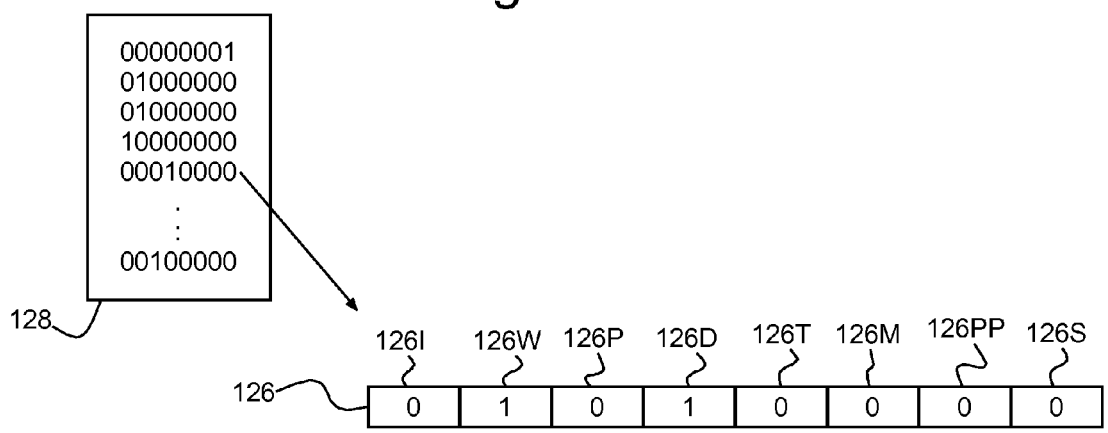
FIG. 2 shows an example of a job location table and a job location mask for a currently despooling print job.

FIG. 2 shows an example of a job location table 128 and a job location mask 126 for a print job currently despooling in this example. The job location mask 126 includes a single bit 126I, 126W, 126P, 126D, 126T, 126M, 126PP and 126S for each monitored location 110, 112, 114, 116, 118, 120, 122, 124, respectively. As each job enters/exits a particular location 110, 112, 114, 116, 118, 120, 122, 124, the respective location 110, 112, 114, 116, 118, 120, 122, 124 initiates an update of the corresponding bit 126I, 126W, 126P, 126D, 126T, 126M, 126PP, 126S in the job location mask 126 for that job. So, for example, the raw spool 112 commonly turns on the raw spool location bit 126W for each print job entering the raw spool 112 as soon as it starts being written onto the raw spool location 126W. Further, and the raw spool location 126W stays on for each job until the job is finally deleted from the raw spool 112, e.g., some time after the job has fully completed printing. Thus, the state of a particular job location mask 126 indicates the current location(s) of a particular job by one or more corresponding set bits, 126W and 126D in this example. Although shown as an eight bit mask in this example, this is for example only and not intended as a limitation. Preferably, the job location mask 126 is multiple bytes wide. For example, a printer 100 with 24 job locations has job location masks 126 that are 3 bytes wide. Thus, the number of defined printer locations defines the width of the job location mask 126 and the number of job locations is selected for the type of print processing information desired.

So, in the example of FIG. 1B, as each job passes from one location 110, 112, 114, 116, 118, 120, 122, 124 to the next, the respective location 110, 112, 114, 116, 118, 120, 122, 124 notifies the job location monitor 130, e.g., by issuing a call. The job location monitor 130 responds by setting the bit corresponding to the next (entry) location (e.g., switching from a logic zero to a logic one). When each job exits a particular location 110, 112, 114, 116, 118, 120, 122, 124, that location 110, 112, 114, 116, 118, 120, 122, 124 also notifies the job location monitor 130, e.g., by issuing a call. The job location monitor 130 responds by resetting a bit (e.g., switching from a logic one "1" to a logic zero "0") in a job location mask 126 corresponding to the one (exit) location. Frequently jobs reside in multiple locations and so, have multiple location bits 126I, 126W, 126P, 126D, 126T, 126M, 126PP and 126S set with multiple corresponding components operating on the job simultaneously. Thus, by which bit location(s) 126I, 126W, 126P, 126D, 126T, 126M, 126PP and 126S is(are) set in a job location mask 126, one can immediately tell the current location (i.e., that location corresponding to the set bit) of the corresponding print job.

So for each print job traversing the printer, a corresponding job location mask 126 dynamically tracks the location of that job. Typically, a preferred printer includes one job location mask 126 for each print job and may include any selected (e.g., by design) number of active print jobs. Further, although described herein as being organized in a single job location table 128 or database, this is for example only and not intended as a limitation. Instead, for example, job location masks 126 may be stored individually and randomly, e.g., in random access memory, or collected in a special purpose register file. Moreover, while the job location monitor 130 is described as monitoring and maintaining the job location masks, this is for example only.

When a print job enters a preferred printer 100, by default the print job enters the initial job location 110 and the corresponding bit location 126I in a new job location mask 126 is set. Preferably, a limited number of print jobs are allowed in the initial job location 110. Typically, as each component (e.g., printer components 116, 118, 120) completes operation on a job, the component passes the job to one of the queues (not shown) where the job may pause (i.e., the job is queued) until the next component is available to operate on the job. Also, incoming print jobs from the initial job location 110, for example, may be spooled to the raw spool 112 before being operated on by components 116, 118, 120 and physical units 122, 124. As a job exits the initial job location 110, the corresponding job location mask bit 126I is reset and the bit corresponding to the new location is set, e.g., 126W. Preferably, the number of jobs in each spool 112, 114 is limited only by available storage (e.g., 108) and the size of the jobs being spooled, i.e., by printer resources. Therefore, any job not currently being processed by a component may be completely contained in one of the printer queues (not shown) or spooled to one of the spools 112, 114 and have corresponding spooling bits 126W, 126P set in respective job location masks 126. The system components (e.g., 116, 118, 120) are print system processes that act on print jobs or corresponding print job data. A typical system component, for example, may be responsible for receiving job data from the network for each print job or for selected print jobs. In this example, despooling 116 despools jobs from the raw spool 112, interpreting/interpreter 118 interprets job print data and Mech 120 is the printing mechanism. As the interpreter 118 operates on a job, the results are stored on the rip spool 114 and both the bit for the interpreter 118 and the corresponding rip spool bit 126P are set.

As each print job is being interpreted, it continues to be spooled to the rip spool 114, where it resides after interpreting 118 is completed, until it is despooled and, e.g., forwarded to the Mech 120 for printing the job with the corresponding rip despooling bit (not shown) and Mech bit 126M being set. Jobs being printed traverse the paper path 122 and also have the corresponding paper path bit 126PP set. As printing completes, pages are stacked in the stacker 124 and the stacker bit 126S is set also. So, as each print job passes through each of these locations 110, 112, 114, 116, 118, 120, 122, 124, a corresponding bit is set in a respective job location mask 126. As each job exits each of these locations 110, 112, 114, 116, 118, 120, 122, 124, the corresponding location bits are reset. Upon print completion, normally the results are completely contained in the stacker 124 and other bits, including spool bits 126W and P are reset.

Figure 3:
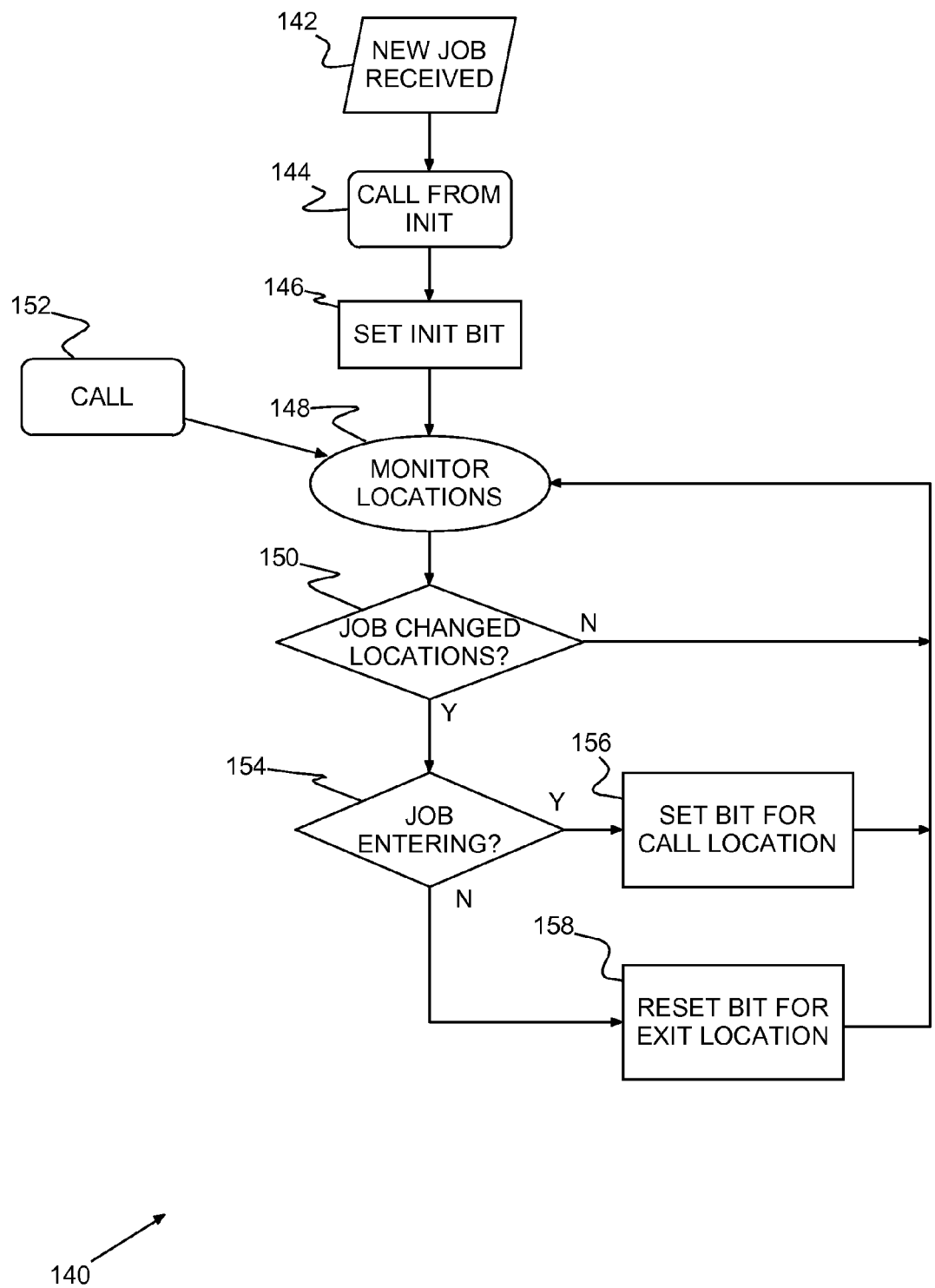
FIG. 3 shows an example of steps in maintaining a job location mask current.

FIG. 3 shows an example of steps 140 in maintaining a job location mask 126 current, according to a preferred embodiment of the present invention with reference to the example of FIGS. 1A-B. Printer location monitoring begins in step 142, when the printer 100 receives a first new job. In step 144 the Init location 110 issues a call that opens a new job location mask 126, e.g., by adding a row to a job location table 128; and in step 146, sets the initial bit 126I for the incoming job. Alternately, the new job location mask 126 may be added with the initial bit 126I set by default. Thereafter, in step 148 the job location monitor 130, for example, begins monitoring print system activity for changes in step 150.

Monitoring in step 148 continues until a location issues a call in step 152 indicating job changes occurs in step 150, e.g., another new job has been received or an existing job is changing location. In step 154, if the call resulted from an existing job entering a location or from a new job, then in step 156 the location bit for the new location (or for the Init location) is set. Otherwise, the call resulted from an existing job exiting location and, in step 158 the previous location bit is reset. After setting the bit in 156 or resetting in step 158, returning to monitoring step 148, monitoring continues/resumes.

So, as a print job enters and exits each of the print job locations 110, 112, 114, 116, 118, 120 122, 124, at least one of the locations issues a call in step 152 and the job location monitor 130 updates the corresponding bit 126I, 126W, 126P, 126D, 126T, 126M, 126PP and 126S in the respective job location mask 126 in real time. Thus, the location of any print job is indicated by the presence of a one in corresponding bit locations 126I, 126W, 126P, 126D, 126T, 126M, 126PP and 126S for the job location mask 126 for that corresponding print job.

Advantageously, the job location mask provides real-time up to date general job status information that may be used in any number of different ways by different printer system components. The job location mask uses minimal space (8 bits in this example) and may be centrally located, e.g., in local store. Further, the job location mask provides a useful debug tool, allowing one to ascertain the location of any job and to tell, for example, if and where a job is hung-up in the printer. Since each print job is in a known job location, a job monitor can report the exact current location of each job, as well as report which jobs are in any given job location, e.g., indicate which job is currently interpreting and which jobs are currently spooled on the raw spool.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

I claim:

1. A printer comprising:
    a plurality of physical print job location units, the printer passing each print job being printed through ones of said plurality of physical print job location units;
    a processor controlling a job location monitor monitoring each of said plurality of print job locations;
    a job location mask for said each print job, each bit location in each said job location mask indicating the presence of a print job in a corresponding one of said plurality of print job locations, said job location monitor updating said job location mask responsive to a respective print job location indicating the presence of said print job; and
    a job location table stored in memory and including a plurality of job location masks, the number of said plurality of job location masks being at least the same as the number of print jobs traversing said printer, said job location table indicating the current location of all print jobs traversing said printer, wherein each of said plurality of print job locations indicates when a print job is entering and exiting and whenever said number of print jobs traversing said printer is fewer than said number of said plurality of job location masks, said each bit location in each available said job location mask indicates the absence of a print job.

2. A printer as in claim 1, each job location mask is n bits wide, where n is the number of job locations, the state of said each job location mask indicating a current location of a respective one of a plurality of print jobs traversing the printer by the contents of the corresponding bit location in the respective job location mask.

3. A printer as in claim 2, further comprising a local store, said job location table being in said local store.

4. A printer as in claim 1, wherein said plurality of physical print job location units include an initial location, a plurality of print spools, a plurality of printer components and a plurality of physical printer locations.

5. A printer as in claim 4, wherein said plurality of print spools comprise a raw spool and a rip spool.

6. A printer as in claim 4, wherein said plurality of printer components comprise a despooling component, an interpreting component and a mechanical print component.

7. A printer as in claim 4, wherein said plurality of physical printer locations comprise a paper path and a paper stacker.

8. A printer comprising:
    a plurality of physical print job processing location units, the printer passing each print job being printed through ones of said plurality of physical print job processing location units;
    means for issuing a call in each of said plurality of physical print job processing location units, said call indicating a print job is entering a respective print job processing location;
    means for monitoring print jobs traversing said plurality of physical print job processing location units; and
    means for storing a job location table with a job location mask for said each print job, each bit location in each said job location mask indicating the presence of a print job in a corresponding one of said plurality of physical print job processing location units, said means for monitoring print jobs updating a respective said job location mask responsive to a call issued from a respective print job processing location, said job location table indicating the current location of all print jobs traversing said printer, wherein each of said means for issuing a call further issues a call when a print job is exiting said respective physical print job processing location unit and whenever said number of print jobs traversing said printer is fewer than said number of said plurality of job location masks, said each bit location in each available said job location mask in said job location table indicates the absence of a print job.

9. A printer as in claim 8, each job location mask is n bits wide, where n is the number of job locations, the state of said each job location mask indicating a current location of a respective one of a plurality of print jobs traversing the printer by the contents of the corresponding bit location in the respective job location mask.

10. A printer as in claim 8, wherein said plurality of physical print job processing location units include an initial location, a plurality of print spools, a plurality of printer components and a plurality of physical printer locations.

11. A printer as in claim 10, wherein said plurality of print spools comprise a raw spool and a rip spool.

12. A printer as in claim 10, wherein said plurality of printer components comprise a despooling component, an interpreting component and a mechanical print component.

13. A printer as in claim 10, wherein said plurality of physical printer locations comprise a paper path and a paper stacker.

14. A method of managing print jobs passing through a printer said method comprising the printer:

monitoring each of a plurality of printer locations in said printer for the presence of a print job, wherein said plurality of printer locations may be simultaneously occupied by multiple print jobs;

setting a corresponding bit in a job location mask in a job location table for a respective said print job as said respective print job enters a corresponding one of said plurality of printer locations, each said job location mask including a corresponding bit for each of said plurality of job locations;

resetting said corresponding bit as each said respective print job exits said corresponding one of said plurality of printer locations, said job location table indicating the current location of all print jobs traversing said printer and whenever the number of print jobs traversing said printer is fewer than the number of said plurality of job location masks, each bit location in each available said job location mask indicates the absence of a print job; and returning to monitoring.

15. A method as in claim 14, before monitoring, the printer defining said plurality of printer locations in said printer and setting said corresponding bit comprises setting multiple bits for a print job occupying multiple respective locations.

16. A method as in claim 14, before monitoring, the printer:
receiving a print job;
issuing a call indicating that the received said print job is in an initial location; and adding a respective said job location mask indicating that said print job is in said initial location.

17. A method as in claim 16, wherein when a print job completes resetting comprises the printer resetting all locations in the respective bit location for the respective job location mask in said job location table.

18. A method as in claim 14, before resetting, the printer:
checking whether said print job is in an initial location; and
whenever said print job is in said initial location,
returning to monitoring.

* * * * *